US012792999B2

(12) United States Patent
Pitsoulis et al.

(10) Patent No.: US 12,792,999 B2
(45) Date of Patent: Nov. 10, 2026

(54) SYSTEMS AND METHODS FOR USING ARTIFICIAL INTELLIGENCE MODELS TO GENERATE A TIME SERIES DISTRIBUTION OF TEXT UNITS

(71) Applicant: Geekbot LTD, Salonika (GR)

(72) Inventors: Leonidas Pitsoulis, Salonika (GR); Nikolaos Papanotas, Salonika (GR); Despoina Xanthopoulou, Salonika (GR)

(73) Assignee: Geekbot LTD, Limassol (CY)

( * ) Notice: Subject to any disclaimer, the term of this patent is extended or adjusted under 35 U.S.C. 154(b) by 118 days.

(21) Appl. No.: 18/475,732

(22) Filed: Sep. 27, 2023

(65) Prior Publication Data

US 2025/0061406 A1 Feb. 20, 2025

(30) Foreign Application Priority Data

Aug. 16, 2023 (GR) .............................. 20230100676

(51) Int. Cl.
*G06Q 10/0639* (2023.01)
*G06F 16/35* (2025.01)
(Continued)

(52) U.S. Cl.
CPC ....... *G06Q 10/06395* (2013.01); *G06F 16/35* (2019.01); *G06F 40/279* (2020.01); *G06F 40/40* (2020.01); *G06Q 10/1057* (2013.01)

(58) Field of Classification Search
None
See application file for complete search history.

(56) References Cited

U.S. PATENT DOCUMENTS 10,860,805 B1 * 12/2020 Coppersmith ........ G06F 40/216
10,936,947 B1 * 3/2021 Flunkert ................. G06F 17/18
(Continued)

FOREIGN PATENT DOCUMENTS

WO WO-2019079071 A1 * 4/2019 ........... G06F 18/285

OTHER PUBLICATIONS

Bentley, Frank, et al. "Health Mashups: Presenting statistical patterns between wellbeing data and context in natural language to promote behavior change." ACM Transactions on Computer-Human Interaction (TOCHI) 20.5 (2013): 1-27. (Year: 2013).*
(Continued)

*Primary Examiner* — Brian M Epstein
*Assistant Examiner* — Derick J Holzmacher
(74) *Attorney, Agent, or Firm* — Bookoff McAndrews, PLLC

(57) ABSTRACT

A method may include receiving, from one or more applications of a digital workspace of an organization, text content generated by users of the organization; partitioning, using a first artificial intelligence (AI) model, the text content into text units; classifying, using a second AI model, the text units into respective well-being-related categories; generating a time series distribution of the text units among the well-being-related categories, based on classifying the text units into the respective well-being-related categories; and causing a user interface to be displayed on a user device, the user interface including the time series distribution of the text units among the well-being-related categories for the organization.

20 Claims, 8 Drawing Sheets

(51) Int. Cl.
*G06F 40/279* (2020.01)
*G06F 40/40* (2020.01)
*G06Q 10/1057* (2023.01)

(56) References Cited

U.S. PATENT DOCUMENTS

| | | | | |
|---|---|---|---|---|
| 11,277,361 | B2 * | 3/2022 | Mann | G06F 40/18 |
| 11,715,134 | B2 * | 8/2023 | Sheth | G06N 20/00 705/14.72 |
| 2017/0351402 | A1 * | 12/2017 | Yoakum | G06Q 10/00 |
| 2017/0351476 | A1 * | 12/2017 | Yoakum | G06F 3/0484 |
| 2019/0102741 | A1 * | 4/2019 | Gupta | G06Q 10/0635 |
| 2019/0222540 | A1 * | 7/2019 | Relangi | G06F 16/951 |
| 2019/0272547 | A1 * | 9/2019 | Coman | G06N 20/00 |
| 2020/0012670 | A1 * | 1/2020 | Heckmann | G06F 16/334 |
| 2020/0090067 | A1 * | 3/2020 | Anders | G06F 18/214 |
| 2020/0219111 | A1 * | 7/2020 | Nair | G06F 40/284 |
| 2021/0216937 | A1 * | 7/2021 | Dhaygude | G06Q 10/06393 |
| 2021/0256084 | A1 * | 8/2021 | Marsh | G06F 16/9537 |
| 2021/0286633 | A1 * | 9/2021 | Bar-on | G06F 9/452 |
| 2021/0344622 | A1 * | 11/2021 | Mann | G06F 40/18 |
| 2021/0365611 | A1 * | 11/2021 | Agrawal | G06N 20/00 |
| 2021/0365643 | A1 * | 11/2021 | Agrawal | G06F 16/3326 |
| 2022/0129816 | A1 * | 4/2022 | Ralhan | G06F 16/23 |
| 2023/0064816 | A1 * | 3/2023 | Matsuoka | G06F 9/4881 |
| 2023/0237399 | A1 * | 7/2023 | Hoang | G06F 40/295 704/9 |
| 2023/0385769 | A1 * | 11/2023 | Helvik | G06F 40/211 |
| 2024/0054430 | A1 * | 2/2024 | Maikhuri | G06F 40/30 |
| 2024/0184989 | A1 * | 6/2024 | Mann | G06F 40/18 |
| 2024/0403794 | A1 * | 12/2024 | Shook | G06N 7/01 |

OTHER PUBLICATIONS

Sahn, V., et al., "DistilBERT, A Distilled Version of BERT: Smaller, Faster, Cheaper and Lighter", arXiv preprint 1910.01108, 5 pp., (2019).

* cited by examiner

SYSTEMS AND METHODS FOR USING ARTIFICIAL INTELLIGENCE MODELS TO GENERATE A TIME SERIES DISTRIBUTION OF TEXT UNITS

CROSS-REFERENCE TO RELATED APPLICATION

This application claims the benefit of Greek patent application No. 20230100676, filed on Aug. 16, 2023, which is incorporated herein in its entirety.

TECHNICAL FIELD

The present disclosure relates to systems and methods for using artificial intelligence (AI) models to generate a time series distribution of text units, generated by users of an organization in association with applications of a digital workspace, among well-being indicators for the organization.

BACKGROUND

A digital workspace can be characterized as a cloud-based environment equipped with integrated tools for communication, collaboration, project management, and security, that enables users of an organization to work effectively and seamlessly from any location. In such a framework, most communication of the users of the organization is in a digital form, such as text or audio associated with various applications of the digital workspace.

A user's well-being can encompass the physical, mental, and emotional health of a user of an organization and a sense of satisfaction and fulfillment in the user's role, and might be determined by various factors such as a supportive work environment, positive relationships, and/or strong team morale. The user's well-being might be important because it enhances productivity, fosters collaboration, drives creativity, bolsters resilience, reduces turnover, and positively impacts an overall organization success.

Measuring organization well-being can be a complex process, and currently involves, among other methods, surveys and questionnaires, performance metrics, engagement metrics, and one-on-one check-ins. Surveys and questionnaires can be effective tools to gauge user happiness, stress levels, satisfaction, and overall sense of well-being. Regularly conducted anonymous surveys can give a pulse of the organization's mental and emotional state. While not an indicator but rather an outcomes of well-being, observing changes in organization performance can give hints about the organization's well-being. A sudden drop in productivity, increased absenteeism, or a rise in mistakes could suggest that well-being is suffering.

High turnover rates might indicate a problem with organization well-being. If users are frequently leaving, it may be because the users are unhappy or stressed. Metrics such as participation in organization activities, contribution to organization meetings, or usage of collaboration tools can offer insights into the organization's engagement level, which indicates high well-being. "360-degree feedback" can involve gathering feedback about each user from their peers, subordinates, supervisors, etc. It can reveal issues that might be affecting organization well-being.

Data related to the utilization of user assistance programs, fitness or wellness initiatives, or sick leave usage can also provide information about organization well-being. Mental health assessments can be done with the help of professionals to evaluate the mental health of users, contributing to a picture of overall organization well-being.

One or more of the foregoing methods can be incorporated into a digital workspace setting. However, the foregoing methods measure organization well-being in discrete points in time instead of continuously, and introduce bias given that the users are aware of the measurement process and hence, responses are less spontaneous and more prone to social desirability.

Given the inherent dynamic nature of what is being measured and the sensitivity to bias, the above methods are not fully accurate and have limited usability.

SUMMARY

According to an embodiment of the present disclosure, a method may include receiving, by one or more processors and from one or more applications of a digital workspace of an organization, text content generated by users of the organization; partitioning, by the one or more processors and using a first artificial intelligence (AI) model, the text content into text units; classifying, by the one or more processors and using a second AI model, the text units into respective well-being-related categories; generating, by the one or more processors, a time series distribution of the text units among the well-being-related categories, based on classifying the text units into the respective well-being-related categories; and generating, by the one or more processors, a user interface that displays the time series distribution of the text units among the well-being-related categories for the organization.

According to an embodiment of the present disclosure, a system may include a memory configured to store instructions; and one or more processors configured to execute the instructions to perform operations comprising: receiving, from one or more applications of a digital workspace of an organization, text content generated by users of the organization; partitioning, using a first artificial intelligence (AI) model, the text content into text units; classifying, using a second AI model, the text units into respective well-being-related categories; generating a time series distribution of the text units among the well-being-related categories, based on classifying the text units into the respective well-being-related categories; and causing a user interface to be displayed on a user device, the user interface including the time series distribution of the text units among the well-being-related categories for the organization.

According to an embodiment of the present disclosure, a non-transitory computer-readable medium may store instructions that, when executed by one or more processors, cause the one or more processors to perform operations comprising: receiving, from one or more applications of a digital workspace of an organization, text content generated by users of the organization; partitioning, using a first artificial intelligence (AI) model, the text content into text units; classifying, using a second AI model, the text units into respective well-being-related categories; generating a time series distribution of the text units among the well-being-related categories, based on classifying the text units into the respective well-being-related categories; and causing a user interface to be displayed on a user device, the user interface including the time series distribution of the text units among the well-being-related categories for the organization.

It may be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

As addressed above, methods for measuring organization well-being (e.g., surveys, questionnaires, check-ins, etc.) may do so in discrete points in time instead of continuously, and introduce bias given that the users are aware of the measurement process. Accordingly, the methods render the measurement of organization well-being to be impossible, inaccurate, impractical, or error-prone.

Some embodiments of the present disclosure provide a platform that is configured to generate, using AI models, a time series distribution of text units among well-being-related categories for an organization in a continuous and opaque manner. In this way, the embodiments do not introduce bias and thus improve prediction and/or measurement accuracy, because the process is opaque to the users. Moreover, the time series distribution corresponds to multiple users of an organization instead of an individual. In this way, the time series distribution does not introduce privacy issues.

Further, the embodiments of the present disclosure provide a technical improvement in the field of well-being measurement by utilizing AI models that classify text units into well-being-related categories in a continuous, non-intrusive, and more accurate manner.

Figure 1:
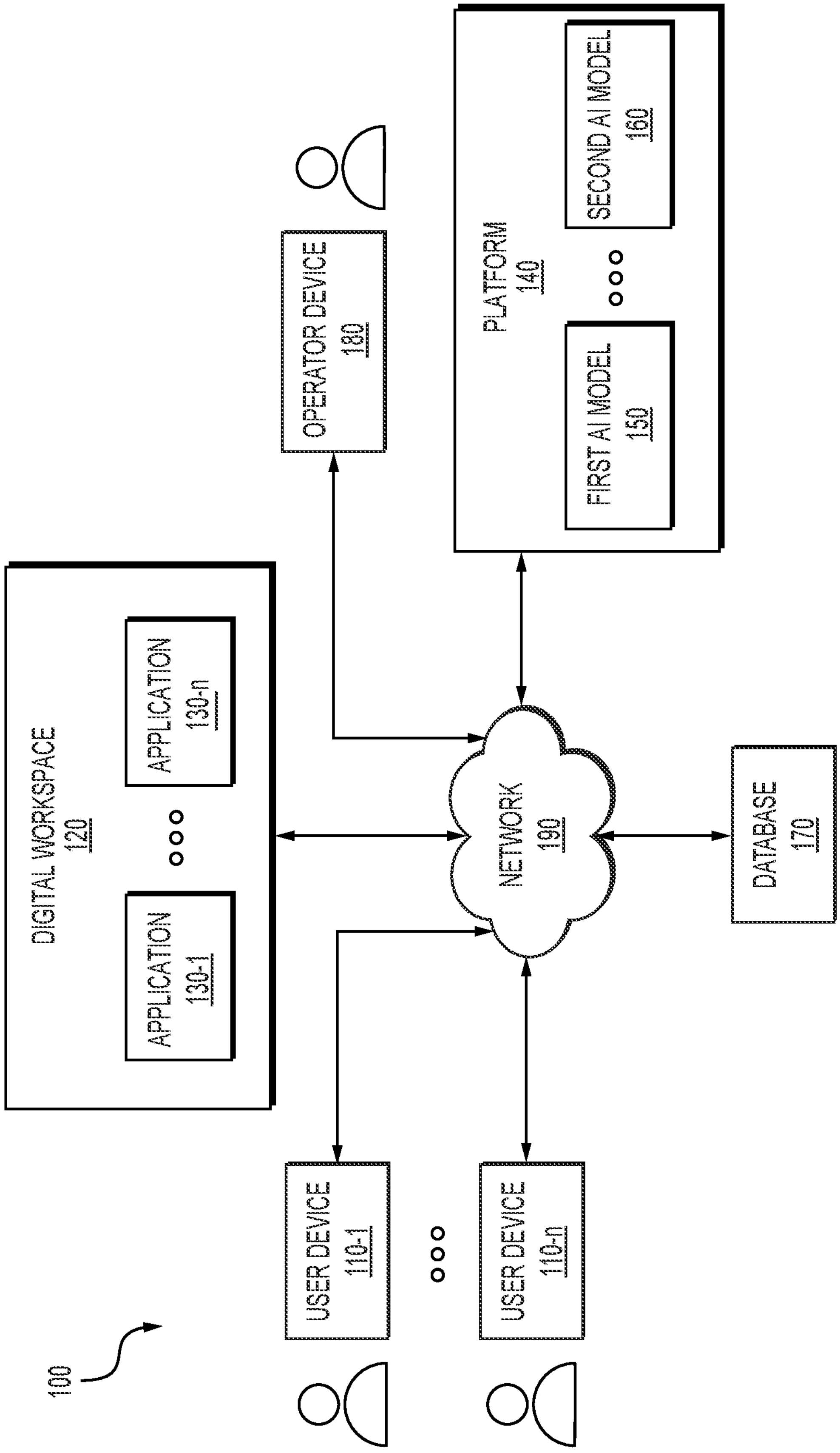
FIG. 1 is a diagram of an example system 100 for generating a time series distribution of text units among well-being-related categories for an organization, according to one or more aspects of the current disclosure.

FIG. 1 is a diagram of an example system 100 for generating a time series distribution of text units among well-being-related categories for an organization As shown in FIG. 1, the system 100 may include a user device 110, a digital workspace 120, an application 130, a platform 140, a first AI model 150, a second AI model 160, a database 170, an operator device 180, and a network 190.

The user device 110 may be a device configured to permit a user to access applications 130 of the digital workspace 120. For example, the user device 110 may be a smartphone, a laptop computer, a desktop computer, a wearable device, or the like.

The digital workspace 120 may be a server or cloud-based environment equipped with integrated tools for communication, collaboration, project management, and security, that enables users of an organization to work effectively and seamlessly from any location.

The application 130 may be an application that permits a user to generate text content such as by providing a text input, or generate content that can be converted to text content such as by providing an audio input and/or a visual input. For example, the application 130 may be a communication application, a productivity application, a collaboration application, a chat platform, or the like.

The platform 140 may be a device configured to receive, from applications 130 of the digital workspace 120 of an organization, text content generated by users of the organization; partition, using the first AI model 150, the text content into text units; classify, using the second AI model 160, the text units into respective well-being-related categories; generate a time series distribution of the text units among the well-being-related categories, based on classifying the text units into the respective well-being-related categories; and cause a user interface to be displayed on the operator device 180, the interface including the time series distribution of the text units among the well-being-related categories for the organization. For example, the platform 140 may be a server, a desktop computer, or the like.

The first AI model 150 may be a model that is configured to partition text content into text units. For example, the first AI model 150 may be an entity recognition model that is trained to partition the text content into the text units.

The second AI model 160 may be a model that is configured to classify text units into respective well-being-related categories. For example, the second AI model 160 may be a natural language understanding model that is trained to classify the text units into the respective well-being-related categories.

The database 170 may be a device configured to store the text content, information identifying the users that generated the text content, the text units, timestamps of the text units, well-being-related categories to which the text units are classified, the time series distribution of the text units among the well-being-related categories, or the like. For example, the database 170 may be a centralized database, a distributed database, a cloud database, a network database, a hierarchical database, or the like.

The operator device 180 may be a device configured to display a user interface that displays the time series distribution of the text units among the well-being-related categories for the organization. For example, the operator device 180 may be a smartphone, a laptop computer, a desktop computer, a wearable device, or the like.

The network 190 may be a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of the devices of the system 100 shown in FIG. 1 are provided as an example. In practice, the system 100 may include additional devices, fewer devices, different devices, or differently arranged devices than those shown in FIG. 1. Additionally, or alternatively, a set of devices (e.g., one or more devices) of the system 100 may perform one or more functions described as being performed by another set of devices of the system 100. It should be understood that a device or portion of a device in the system 200 may, in some embodiments, integrated with or incorporate into one or more other devices in the system 200. In other embodiments, operations or aspects of one or more of the devices in the system 200 are distributed amongst one or more other devices. Any suitable arrangement and/or integration of the devise of the system 100 can be used.

Figure 2:
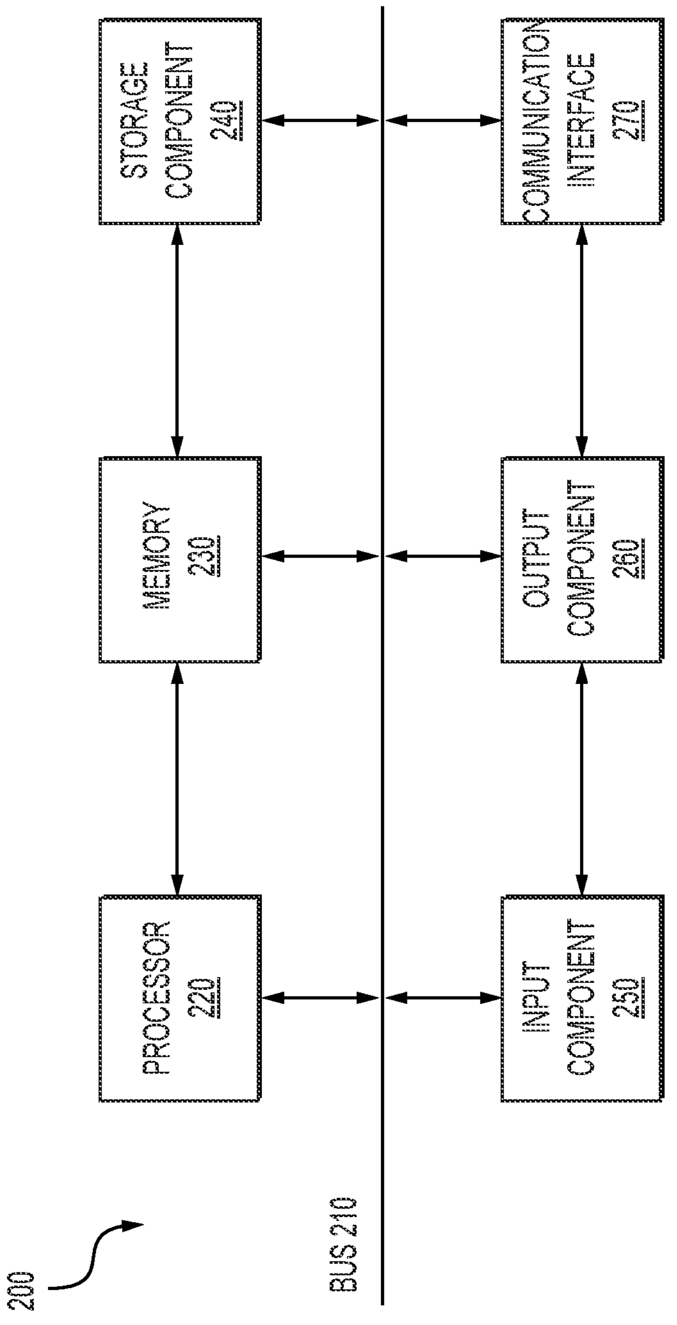
FIG. 2 is a diagram of example components of a device 200 that may execute the techniques described herein, according to one or more aspects of the current disclosure.

FIG. 2 is a diagram of example components of a device 200 that may execute the techniques describes herein. The device 200 may correspond the user device 110, the digital workspace 120, the application 130, the platform 140, the first AI model 150, the second AI model 160, the database 170, and/or the operator device 180. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 may be implemented in hardware, firmware, or a combination of hardware and software. The processor 220 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component.

Figure 3:
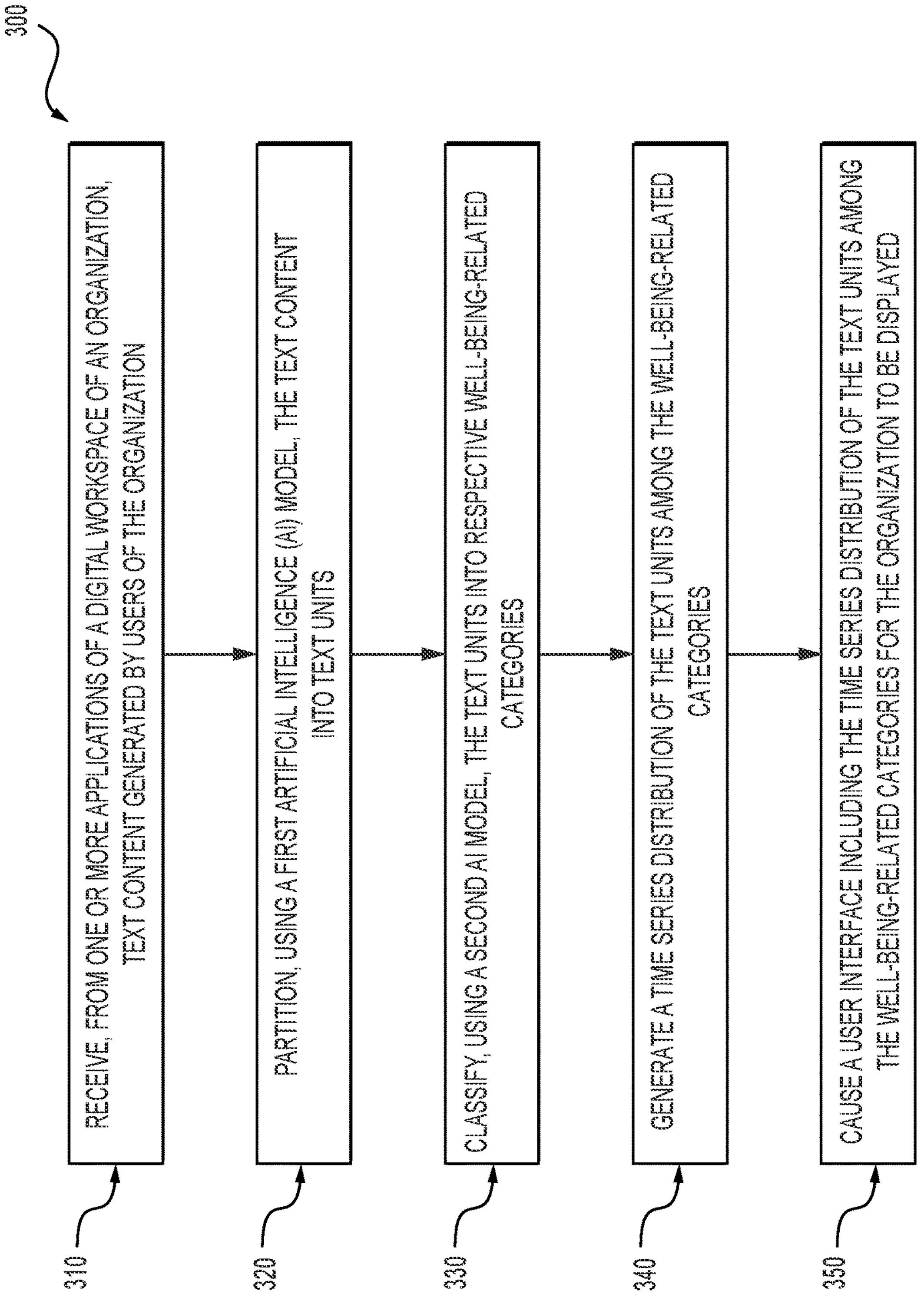
FIG. 3 is a flowchart of an example process 300 for generating a time series distribution of text units among well-being-related categories for an organization, according to one or more aspects of the current disclosure.
Figure 4A:
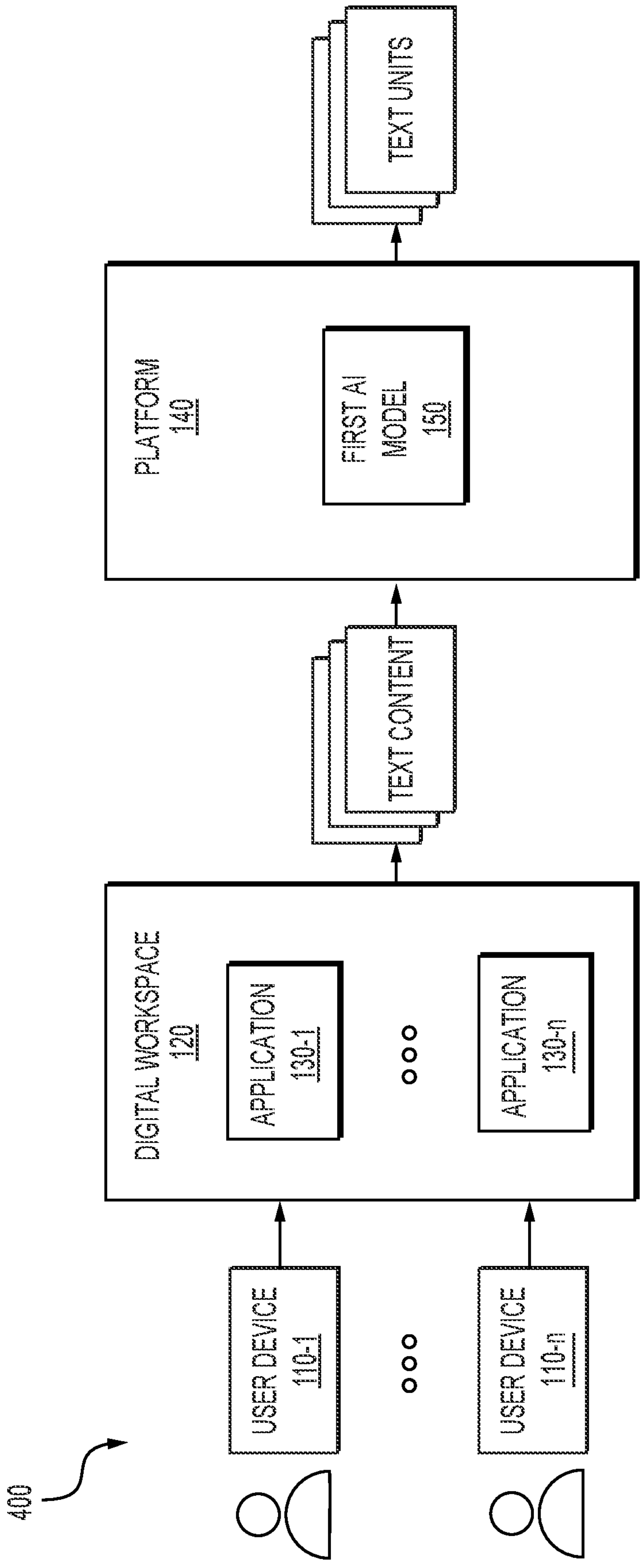
FIGS. 4A and 4B are diagrams of an example process 400 for generating a time series distribution of text units among well-being-related categories for an organization, according to one or more aspects of the current disclosure.
Figure 4B:
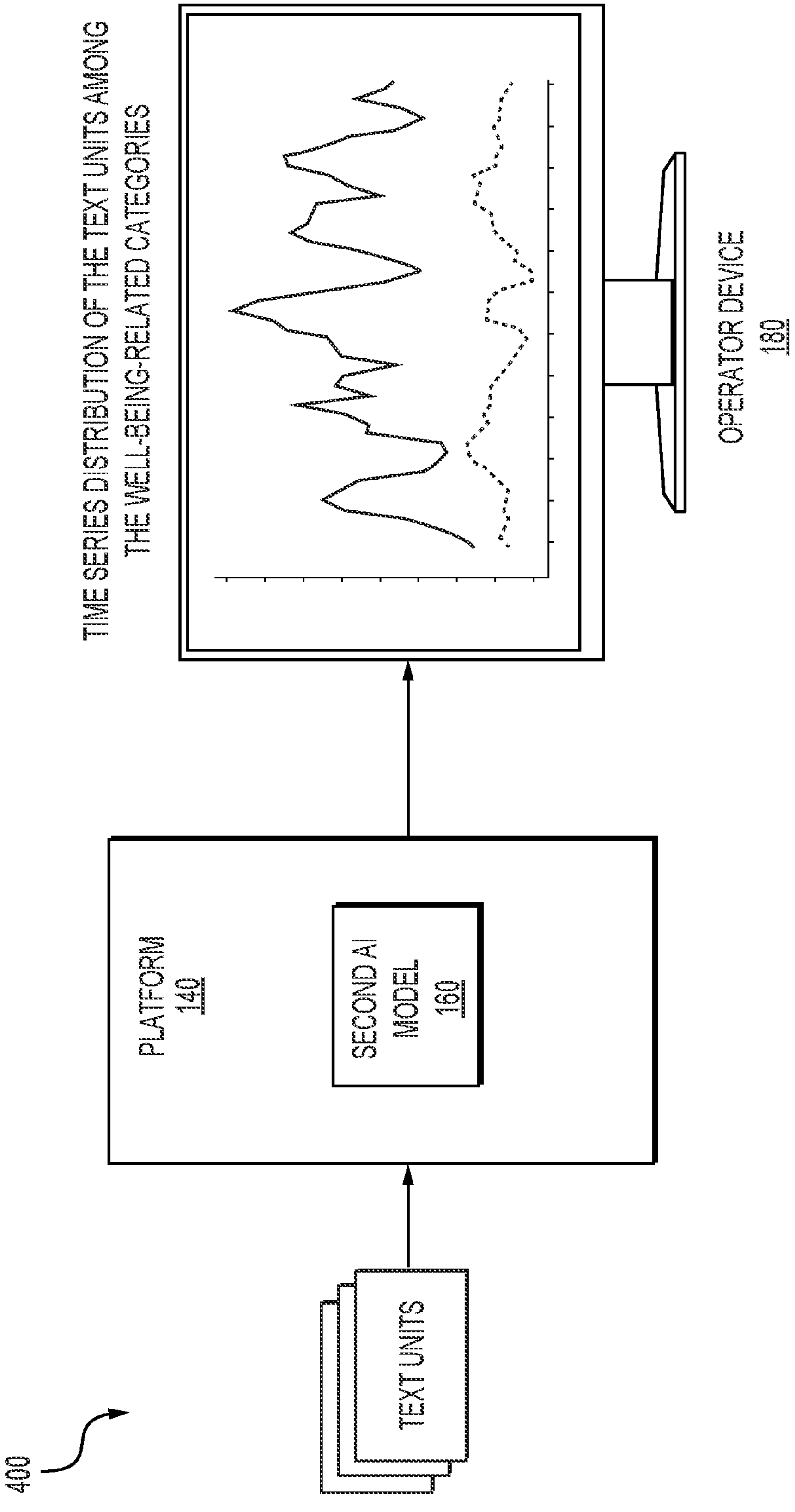

The processor 220 may include one or more processors capable of being programmed to perform a function (e.g., functions described in FIGS. 3, 4A, and 4B). The memory 230 may include a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 may store information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 may include a component that permits the device 200 to receive information, such as via user input (e.g., a touch screen display, a keyboard, a keypad, a mouse, a button, a switch, a camera, and/or a microphone for receiving the reference audio input and/or visual input). Additionally, or alternatively, the input component 250 may include a sensor for sensing information (e.g., a global positioning system (GPS) component, an accelerometer, a gyroscope, and/or an actuator). The output component 260 may include a component that provides output information from the device 200 (e.g., a display, a speaker for outputting sound at the output sound level, and/or one or more light-emitting diodes (LEDs)).

The communication interface 270 may include a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes based on the processor 220 executing software instructions stored by a non-transitory computer-readable medium, such as the memory 230 and/or the storage component 240. A computer-readable medium may be defined herein as a non-transitory memory device. A memory device may include memory space within a single physical storage device or memory space spread across multiple physical storage devices.

The software instructions may be read into the memory 230 and/or the storage component 240 from another computer-readable medium or from another device via the communication interface 270. When executed, the software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of the components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

FIG. 3 is a flowchart of an example process 300 for generating a time series distribution of text units among well-being-related categories for an organization, according to one or more aspects of the current disclosure.

As shown in FIG. 3, the process 300 may include receiving, from one or more applications of a digital workspace of an organization, text content generated by users of the organization (operation 310).

The platform 140 may receive, from applications 130 of the digital workspace 120 of an organization, text content generated by users of the organization. For example, the platform 140 may receive the text content via respective application programming interfaces (APIs) of the applications 130. The platform 140 may receive the text content in substantially real-time as the text content is generated, receive the text content at predetermined intervals (e.g., every five minutes, every hour, etc.), receive the text content based on a request from the operator device 180, or the like. As an example, and as shown in FIG. 4A, users of user devices 110-1 through 110-*n* may interact with applications 130-1 through 130-*n* of a digital workspace 120 to generate text content.

The text content may be text generated by a user based on the user inputting the text to an application 130. For example, a user may input text to an application 130 that is a messaging application. Alternatively, the text content may be text generated by the user based on the user inputting audio and/or video to an application 130. For example, the user may talk to another user via an application 130 that is a phone application. In this case, the platform 140 may convert the audio content into text content.

The organization may be a company, a firm, an entity, a business, a group, a school, a community, a group of people, or the like. The users may be users of the digital workspace 120 of the organization. For example, the users may be employees, students, members, constituents, residents, or the like.

The platform 140 may receive the text content dynamically and in a non-invasive manner. That is, the users may use the applications 130 of the digital workspace 120 in a regular manner, and the platform 140 may receive the text content dynamically and organically based on the users generating the text content.

As further shown in FIG. 3, the process 300 may include partitioning, using a first artificial intelligence (AI) model, the text content into text units (operation 320).

The platform 140 may partition, using the first AI model 150, the text content into text units. For example, the platform 140 may input the text content into the first AI model 150, and receive the text units based on an output of the first AI model 150. The first AI model 150 may be a machine learning model. In one embodiment, the first AI model 150 may be an entity recognition model that is trained to partition the text content into the text units. For example, the first AI model 150 may be a bidirectional encoder representations from transformers (BERT) model that is trained using a masked language modelling objective, e.g., a distilled version of BERT (DistilBERT). As an example, and as shown in FIG. 4A, the first AI model 150 of the platform 140 may receive the text content, and generate text units.

The text units may be sentences, a group of words (e.g., three words, five words, etc.), a clause, a phrase, a particular set of words (e.g., a set of words including a subject, a verb, and a noun), or the like. In some cases, the text units may be a minimal body of text that includes well-being-related information.

As further shown in FIG. 3, the process 300 may include classifying, using a second AI model, the text units into respective well-being-related categories (operation 330).

The platform 140 may classify, using the second AI model 160, the text units into respective well-being-related categories. For example, the platform 140 may input the text units into the second AI model 160, and receive classifications of the text units based on an output of the second AI model 160. The second AI model 160 may be a machine learning model. In one embodiment, the second AI model 160 may be a natural language understanding model that is trained to classify the text units into the respective well-being-related categories. For example, the second AI model 160 may be a BERT model that is trained using a masked language modelling objective, e.g., a fine-tuned version of a Robustly Optimized BERT Pretraining Approach (ROBERTa). As an example, and as shown in FIG. 4B, the second AI model 160 of the platform 140 may receive the text units, and classify the text units into well-being-related categories.

A well-being-related category may refer to a category associated with a particular area of well-being for a user. For example, a well-being-related category may identify a particular indicator of well-being, as well as potential antecedents (e.g., context characteristics) and consequences (e.g., performance) as defined in organization psychology literature.

As a particular example, a well-being-related category may be "lack of autonomy," which may identify that a user believes that the use's role lacks autonomy. As another example, a well-being-related category may be "autonomy," which may identify that a user believes the user's role provides autonomy. As another example, a well-being-related category may be "social support," which may identify that the user believes that the organization provides social support to the user. As another example, a well-being-related category may be "lack of social support," which may indicate that the user believes that the organization does not provide social support to the user.

As another example, a well-being-related category may be "engagement," which may identify the user is engaged by the user's role. As another example, a well-being-related category may be "lack of engagement," which may identify that the user is not engaged by the user's role. As another example, a well-being-related category may be "exhaustion," which may identify that the user feels exhausted in performing their role. As another example, a well-being-related category may be "extra-role work," which may identify that the user is performing tasks that are not part of their role but contribute to the goals of the organization. As another example, a well-being-related category may be "in-role work," which may identify that the user is performing tasks that the user believes are within their role description.

As another example, a well-being-related category may be "mental demands," which may identify mental demands of the user in performing his or her role. As another example, a well-being-related category may be "negative emotions," which may identify negative emotions experienced by the user in performing his or her role. As another example, a well-being-related category may be "positive emotions," which may identify positive emotions experienced by the user in performing his or her role.

As another example, a well-being-related category may be "positive team climate," which may identify that the user believes that the organization provides a positive team climate. As another example, a well-being-related category may be "lack of positive team climate," which may identify that the user believes that the organization does not provide a positive team climate. As another example, a well-being-related category may be "home-work interference," which may identify that the user believes that the user's role is affecting his or her work-life balance. As another example, a well-being-related category may be "workload," which may identify a user's perceived workload within the organization. Although particular well-being-related categories are provided herein as examples, it should be understood that the embodiments herein are applicable to other types of well-being-related categories.

The platform 140 may classify a text unit into a particular well-being-related category, generate an entry for the text unit, and store the entry in the database 170. The entry may identify a user that generated the text unit (e.g., a user identifier, a role identifier, or the like), a time frame of the text unit (e.g., a timestamp), an application 130 in which the text unit was generated (e.g., an application identifier), a well-being-related category into which the text unit was classified (e.g., a well-being-related category identifier), or a combination thereof. In some implementations, the platform 140 may determine whether a text unit is capable of being classified into a well-being-related category, and selectively store an entry for the text unit based on whether the text unit is capable of being classified into a well-being-related category. For example, if the platform 140 determines that the text unit is classified into a well-being-related category, then the platform 140 may generate an entry and store the entry in the database 170. Alternatively, if the platform 140 determines that the text unit is not capable of classified into a well-being-related category, then the platform 140 may refrain from generating an entry for the text unit.

As further shown in FIG. 3, the process 300 may include generating a time series distribution of the text units among the well-being-related categories, based on classifying the text units into the respective well-being-related categories (operation 340).

For example, the platform 140 may generate a time series distribution of the text units among the well-being-related categories. The time series distribution may identify a distribution of the text units generated by users of the organization among the well-being-related categories across time. As an example, and as shown in FIG. 4B, the platform 140 may generate a time series distribution of the text units among the well-being-related categories.

The platform 140 may receive input information from the operator device 180, identify entries in the database 170 that correspond to the input information, and generate the time series distribution using the entries.

In some implementations, the input information may include information identifying a set of users for which to generate the time series distribution. For example, the platform 140 may receive input information identifying that the time series distribution is to be generated for all of the users of the organization, a particular subset of the users of the organization, users having a particular role within the organization, or the like.

Additionally, or alternatively, the input information may include information identifying a time frame for which to generate the time series distribution. For example, the platform 140 may receive input information identifying that the time series distribution is to be generated for all time frames for which entries are available, for a particular time frame (e.g., a particular year, a particular month, a particular week, etc.), or the like.

Additionally, or alternatively, the input information may include information identifying an application 130 for which to generate the time series distribution. For example, the platform 140 may receive input information identifying that the time series distribution is to be generated for all applications 130 of the digital workspace 120, a subset of applications 130 of the digital workspace 120, a particular application 130 of the digital workspace 120, or the like.

Additionally, or alternatively, the input information may include information identifying a well-being-related category for which to generate the time series distribution. For example, the platform 140 may receive input information identifying that the time series distribution is to be generated for all of the well-being-related categories, a subset of the well-being-related categories, a particular well-being-related category, or the like.

The platform 140 may identify entries in the database 170 that correspond to the input information, and generate the time series distribution using the entries. In some implementations, the platform 140 may use an aggregator function to combine numerical amounts for the well-being-related categories using the entries in the database 170, and generate the time series distribution. For instance, the time series distribution may identify an amount of text units that have been classified into a particular well-being-related category.

The time series distribution may identify an amount of text units that have been classified into a well-being-related category across time. In some implementations, the time series distribution may identify a discrete amount of text units that have been classified into a well-being-related category. For example, the discrete amount may be "10," "30," "50," etc. Additionally, or alternatively, the time series distribution may identify a relative amount of text units that have been classified into a well-being-related category. For example, the relative amount may be a percentage of text units that have been classified into a particular well-being-related category. As an example, if the organization is associated with 1000 generated text units, and 100 of the text units have been classified into a particular well-being-related category, then the relative amount would be 10%. As another example, the relative amount may be a percentage of text units as compared to a subset of other well-being-related categories.

As further shown in FIG. 3, the process 300 may include causing a user interface to be displayed on a user device (e.g., user device 110 and/or operator device 180), the user interface including the time series distribution of the text units among the well-being-related categories for the organization (operation 350).

For example, the platform 140 may generate a user interface that displays the time series distribution of the text units among the well-being-related categories for the organization, and cause the user interface to be displayed on the operator device 180. As an example, and as shown in FIG. 4B, the platform 140 may generate a user interface that displays time series distribution, and cause the user interface to be displayed on the operator device 180.

The user interface may display the time series distribution. For example, the user interface may display the well-being-related categories to which the time series distribution is applicable, and may display amounts of the well-being-related categories across time. The amounts may indicate the distribution of the text units among the well-being-related categories.

Figure 5:
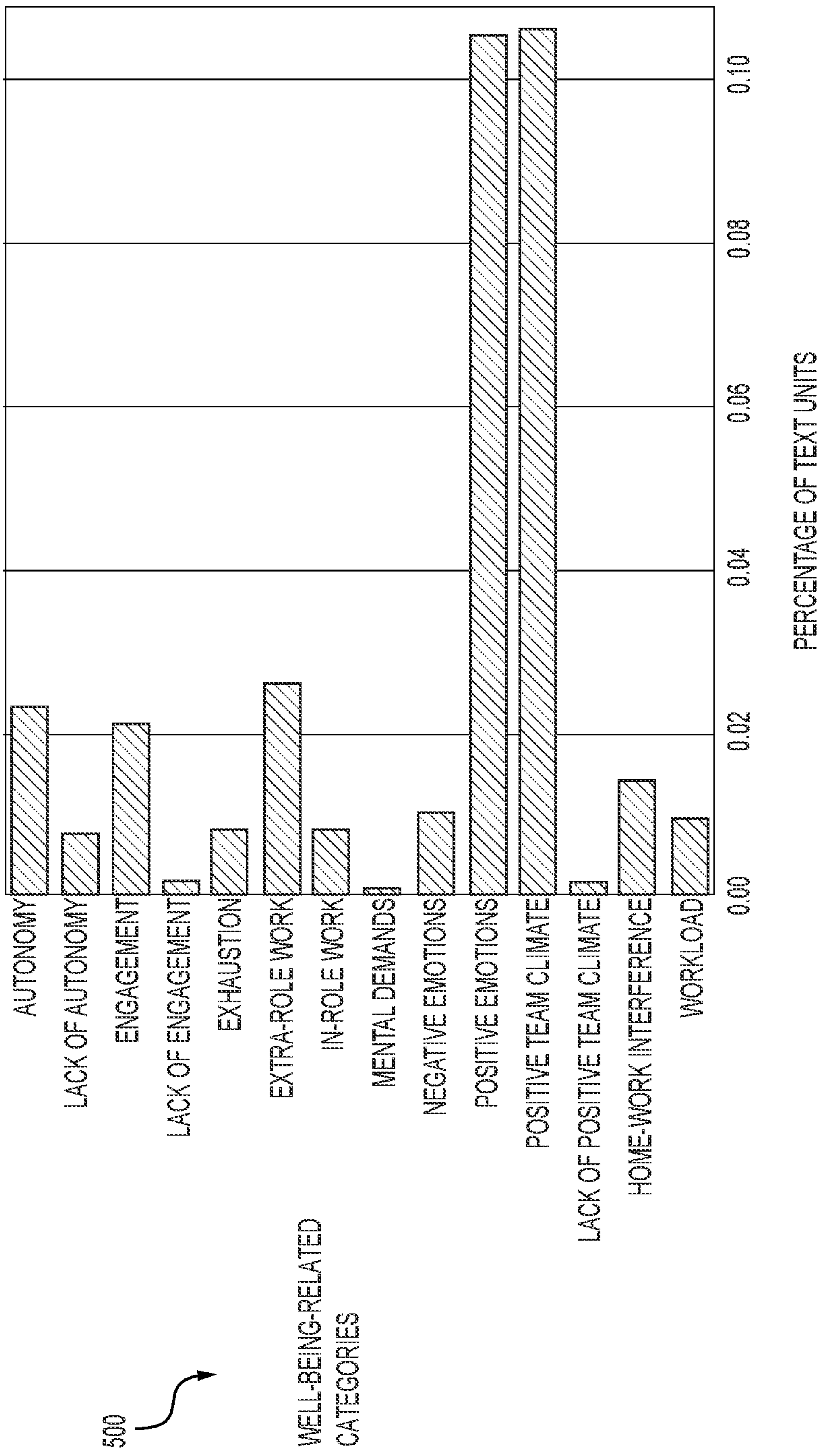
FIG. 5 is a diagram of an example user interface 500 of a time series distribution of text units among well-being-related categories for an organization, according to one or more aspects of the current disclosure.

As an example, and referring to FIG. 5, the user interface may display the well-being-related categories on a y-axis of a graph, and display the percentage of text units among the well-being-related categories on the x-axis of the graph. Further, the user interface may display particular amounts for the well-being-related categories in the form of bars on the graph. In this way, an operator of the operator device 180 may ascertain the distribution of the text units among the well-being-related categories. As shown, the well-being-related categories of "positive emotions" and "positive team climate" are associated with a relatively high percentage of the text units.

Figure 6:
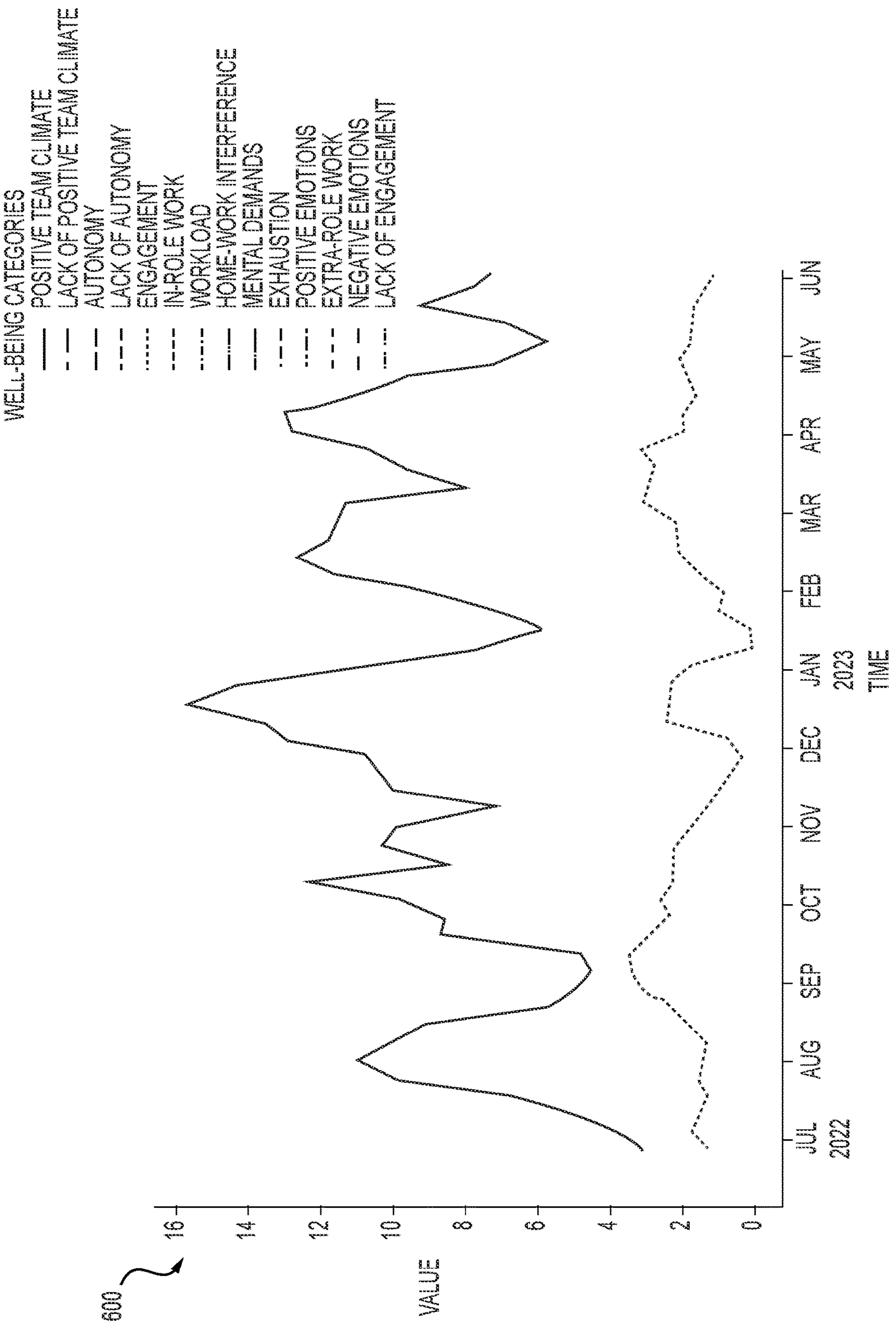
FIG. 6 is a diagram of an example user interface 600 of a time series distribution of text units among well-being-related categories for an organization, according to one or more aspects of the current disclosure

As another example, and referring to FIG. 6, the user interface may display amounts of the well-being-related categories on a y-axis of a graph, and time on an x-axis of the graph. Further, the user interface may display particular amounts for the well-being-related categories in the form of lines on the graph. The user interface may visually differentiate the lines to correspond to the particular well-being-related categories. In this way, an operator of the operator device 180 may ascertain the time series distribution of the text units among the well-being-related categories across time.

The platform 140 may receive additional text content in substantially real-time as the text content is generated, and update the time series distribution using the additional text content. That, is the platform 140 may automatically update the time series distribution in substantially real-time as text content is generated, and update the user interface to display the updated time series distribution. In this way, an operator of the operator device 180 may ascertain the well-being of the users of the organization. As used herein, "substantially real-time" may refer to a time frame of 1 second, 5 seconds, 1 minute, etc.

In some implementations, the platform 140 may generate a notification based on the time series distribution. For example, the platform 140 may generate a notification based on an amount of a well-being-related category satisfying a threshold, based on a change in an amount of a well-being-related category satisfying a threshold, or the like. As a particular example, the platform 140 may generate a notification based on a percentage of the text units being classified into a particular well-being-related category being greater than 10 percent, 20 percent, etc. The platform 140 may transmit the notification to the operator device 180. For example, the platform 140 may transmit a notification to a particular operator device 180 of a particular operator such as a manager, a human resource department, or the like. Additionally, or alternatively, the platform 140 may automatically schedule a meeting using an application 130. Additionally, or alternatively, the platform 140 may use a large language model to generate advice, and provide the advice to an operator device 180. Additionally, or alternatively, the platform 140 may receive external data such as organization metrics, customer metrics, etc., and correlate the external data with the time series distribution. This would allow making decisions to improve organizational functioning. Further, the platform 140 may provide the correlated data to the operator device 180 for display.

Figure 7:
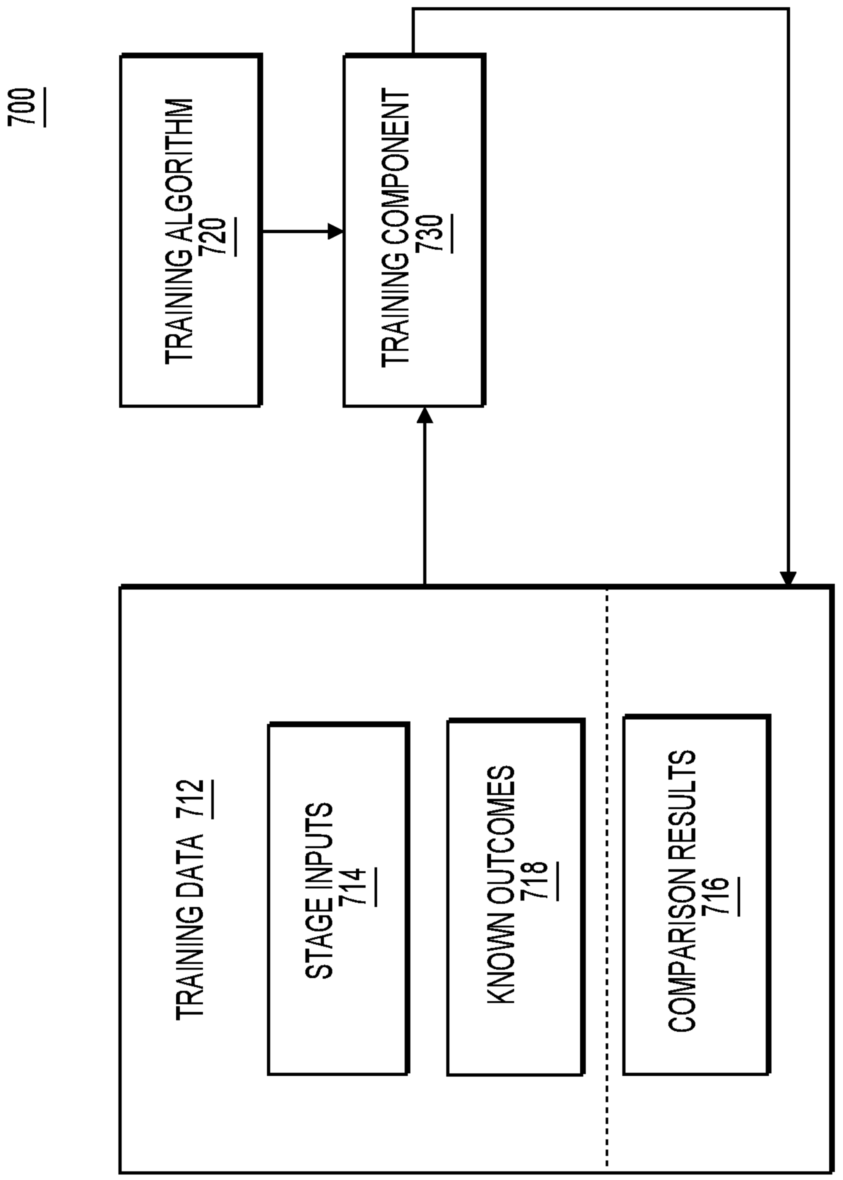
FIG. 7 is a diagram of an example process 700 for training an AI model.

FIG. 7 is a diagram of an example process 700 for training an AI model (e.g., the first AI model 150 and/or the second AI model 160). An AI model may be trained using the process 700 of FIG. 7. Training data 712 may include one or more of stage inputs 714 and known outcomes 718 related to the AI model to be trained. The stage inputs 714 may be from any applicable source including text, visual representations, data, values, comparisons, stage outputs, or the like. The known outcomes 718 may be included for the AI models generated based on supervised or semi-supervised training. An unsupervised AI model may not be trained using known outcomes 718. Known outcomes 718 may include known or desired outputs for future inputs similar to or in the same category as stage inputs 714 that do not have corresponding known outputs.

The training data 712 and a training algorithm 720 may be provided to a training component 730 that may apply the training data 712 to the training algorithm 720 to generate the AI model. According to an implementation, the training component 730 may be provided comparison results 716 that compare a previous output of the corresponding AI model to apply the previous result to re-train the AI model. The comparison results 716 may be used by training component 730 to update the corresponding AI model. The training algorithm 720 may utilize AI networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, classifiers such as K-Nearest Neighbors, and/or discriminative models such as Decision Forests and maximum margin methods, models specifically discussed in the present disclosure, or the like.

An AI model used herein may be trained and/or used by adjusting one or more weights and/or one or more layers of the AI model. For example, during training, a given weight may be adjusted (e.g., increased, decreased, removed) based on training data or input data. Similarly, a layer may be updated, added, or removed based on training data/and or input data. The resulting outputs may be adjusted based on the adjusted weights and/or layers.

As addressed above, some embodiments of the present disclosure provide the platform 140 that is configured to generate, using the first AI model 150 and the second AI model 160, a time series distribution of text units among well-being-related categories for an organization in a continuous and opaque manner. In this way, the embodiments do not introduce bias and thus improve the prediction and/or measurement accuracy, because the process is opaque to the users. Moreover, the time series distribution corresponds to multiple users of an organization instead of an individual. In this way, the time series distribution does not introduce privacy issues.

It will be understood that the steps of methods discussed are performed in one embodiment by an appropriate processor (or processors) of a processing (e.g., computer) system executing instructions (computer-readable code) stored in storage. It will also be understood that the disclosure is not limited to any particular implementation or programming technique and that the disclosure is implementable using any appropriate techniques for implementing the functionality described herein. The disclosure is not limited to any particular programming language or operating system.

It should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

Thus, while there has been described what are believed to be the preferred embodiments of the invention, those skilled in the art will recognize that other and further modifications can be made thereto without departing from the spirit of the invention, and it is intended to claim all such changes and modifications as falling within the scope of the invention. For example, any formulas given above are merely representative of procedures that can be used. Functionality can be added or deleted from the block diagrams and operations are interchangeable among functional blocks. Steps can be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

We claim:

1. A computer-implemented method comprising:

training, by one or more processors using a training algorithm, a first artificial intelligence (AI) model to partition text content into text units and a second AI model to classify the text units into respective well-being-related categories based on training data including inputs and known outcomes;

receiving, by the one or more processors and from one or more applications of a digital workspace of an organization, the text content generated by a plurality of users of the organization in a non-invasive manner, wherein the plurality of users use the one or more applications in a regular manner and the text content is received organically based on the users generating the text content during the use of the one or more applications;

partitioning, by the one or more processors and using the first AI model, the text content into the text units that are each a minimal body of text containing well-being-related information;

classifying, by the one or more processors and using the second AI model, the text units into the respective well-being-related categories, wherein the well-being related categories include two or more of autonomy, social support, engagement, exhaustion, workload, or home-work interference;

generating, by the one or more processors, a time series distribution of the text units among the well-being-related categories based on classifying the text units into the respective well-being-related categories in a continuous and opaque manner that reduces bias, wherein the time series distribution identifies an amount of the text units that have been classified into each of the well-being-related categories across time, and wherein the time series distribution corresponds to the plurality of users of the organization;

dynamically updating, by the one or more processors and in real-time, the time series distribution based on additional text content received after initial generation of the time series distribution;

retraining, by the one or more processors using the training algorithm, the first AI model and/or the second AI model using updated training data based on the additional text content, and adjusting one or more weights of the first AI model and/or the second AI model based on a comparison between previous outputs and updated known outcomes; and causing, by the one or more processors, a user interface to be displayed on a user device, the user interface including the dynamically updated time series distribution of the text units among the well-being-related categories for the organization.

2. The computer-implemented method of claim 1, wherein receiving the text content comprises receiving the text content from one or more application programming interfaces (APIs) of the one or more applications.

3. The computer-implemented method of claim 1, wherein the text units are sentences.

4. The computer-implemented method of claim 1, further comprising:

storing, by the one or more processors, information identifying the text units, respective users associated with the text units, and respective categories to which the text units are classified in a database.

5. The computer-implemented method of claim 4, further comprising:

receiving, by the one or more processors, a user input identifying a set of user identifiers, a time frame, and a set of applications; and retrieving, by the one or more processors and from the database, the information identifying the text units, the respective users associated with the text units, and the respective categories to which the text units are classified, based on receiving the user input identifying the set of user identifiers, the time frame, and the set of applications, wherein the time series distribution of the text units among the well-being-related categories is generated based on retrieving, from the database, the information identifying the text units, the respective users associated with the text units, and the respective categories to which the text units are classified.

6. The computer-implemented method of claim 1, wherein the first AI model is an entity recognition model that is trained to partition the text content into the text units.

7. The computer-implemented method of claim 1, wherein the second AI model is a natural language understanding model that is trained to classify the text units into the respective well-being-related categories.

8. A system comprising:

a memory configured to store instructions; and one or more processors configured to execute the instructions to perform operations comprising:

training, using a training algorithm, a first artificial intelligence (AI) model to partition text content into text units and a second AI model to classify the text units into respective well-being-related categories based on training data including inputs and known outcomes;

receiving, from one or more applications of a digital workspace of an organization, the text content generated by a plurality of users of the organization in a non-invasive manner, wherein the plurality of users use the one or more applications in a regular manner and the text content is received organically based on the users generating the text content during the use of the one or more applications;

partitioning, using the first AI model, the text content into the text units that are each a minimal body of text containing well-being-related information;

classifying, using the second AI model, the text units into the respective well-being-related categories, wherein the well-being related categories include two or more of autonomy, social support, engagement, exhaustion, workload, or home-work interference;

generating a time series distribution of the text units among the well-being-related categories based on classifying the text units into the respective well-being-related categories in a continuous and opaque manner that reduces bias, wherein the time series distribution identifies an amount of the text units that have been classified into each of the well-being-related categories across time, and wherein the time series distribution corresponds to the plurality of users of the organization;

dynamically updating, in real-time, the time series distribution based on additional text content received after initial generation of the time series distribution;

retraining, using the training algorithm, the first AI model and/or the second AI model using updated training data based on the additional text content, and adjusting one or more weights of the first AI model and/or the second AI model based on a comparison between previous outputs and updated known outcomes; and causing a user interface to be displayed on a user device, the user interface including the dynamically updated time series distribution of the text units among the well-being-related categories for the organization.

9. The system of claim 8, wherein receiving the text content comprises receiving the text content from one or more application programming interfaces (APIs) of the one or more applications.

10. The system of claim 8, wherein the text units are sentences.

11. The system of claim 8, wherein the operations further comprise:

storing information identifying the text units, respective users associated with the text units, and respective categories to which the text units are classified in a database.

12. The system of claim 11, wherein the operations further comprise:

receiving a user input identifying a set of user identifiers, a time frame, and a set of applications; and retrieving, from the database, the information identifying the text units, the respective users associated with the text units, and the respective categories to which the text units are classified, based on receiving the user input identifying the set of user identifiers, the time frame, and the set of applications, wherein the time series distribution of the text units among the well-being-related categories is generated based on retrieving, from the database, the information identifying the text units, the respective users associated with the text units, and the respective categories to which the text units are classified.

13. The system of claim 8, wherein the first AI model is an entity recognition model that is trained to partition the text content into the text units.

14. The system of claim 8, wherein the second AI model is a natural language understanding model that is trained to classify the text units into the respective well-being-related categories.

15. A non-transitory computer-readable medium storing instructions that, when executed by one or more processors, cause the one or more processors to perform operations comprising:

training, using a training algorithm, a first artificial intelligence (AI) model to partition text content into text units and a second AI model to classify the text units into respective well-being-related categories based on training data including inputs and known outcomes;

receiving, from one or more applications of a digital workspace of an organization, the text content generated by a plurality of users of the organization in a non-invasive manner, wherein the plurality of users use the one or more applications in a regular manner and the text content is received organically based on the users generating the text content during the use of the one or more applications;

partitioning, using the first AI model, the text content into the text units that are each a minimal body of text containing well-being-related information;

classifying, using the second AI model, the text units into the respective well-being-related categories, wherein the well-being related categories include two or more of autonomy, social support, engagement, exhaustion, workload, or home-work interference;

generating a time series distribution of the text units among the well-being-related categories based on classifying the text units into the respective well-being-related categories in a continuous and opaque manner that reduces bias, wherein the time series distribution identifies an amount of the text units that have been classified into each of the well-being-related categories across time, and wherein the time series distribution corresponds to the plurality of users of the organization;

dynamically updating, in real-time, the time series distribution based on additional text content received after initial generation of the time series distribution;

retraining, using the training algorithm, the first AI model and/or the second AI model using updated training data based on the additional text content, and adjusting one or more weights of the first AI model and/or the second AI model based on a comparison between previous outputs and updated known outcomes; and causing a user interface to be displayed on a user device, the user interface including the dynamically updated time series distribution of the text units among the well-being-related categories for the organization.

16. The non-transitory computer-readable medium of claim 15, wherein receiving the text content comprises receiving the text content from one or more application programming interfaces (APIs) of the one or more applications.

17. The non-transitory computer-readable medium of claim 15, wherein the text units are sentences.

18. The non-transitory computer-readable medium of claim 15, wherein the operations further comprise:

storing information identifying the text units, respective users associated with the text units, and respective categories to which the text units are classified in a database.

19. The non-transitory computer-readable medium of claim 18, wherein the operations further comprise:

receiving a user input identifying a set of user identifiers, a time frame, and a set of applications; and retrieving, from the database, the information identifying the text units, the respective users associated with the text units, and the respective categories to which the text units are classified, based on receiving the user input identifying the set of user identifiers, the time frame, and the set of applications, wherein the time series distribution of the text units among the well-being-related categories is generated based on retrieving, from the database, the information identifying the text units, the respective users associated with the text units, and the respective categories to which the text units are classified.

20. The non-transitory computer-readable medium of claim 15, wherein the first AI model is an entity recognition model that is trained to partition the text content into the text units, and wherein the second AI model is a natural language understanding model that is trained to classify the text units into the respective well-being-related categories.

* * * * *